United States Patent [19]

Dammann

[11] 4,374,216
[45] Feb. 15, 1983

[54] STABLE HIGH SOLIDS WATER-IN-OIL SLURRY DISPERSION COMPOSITION

[75] Inventor: Laurence G. Dammann, Crestwood, Ky.

[73] Assignee: Celanese Corporation, New York, N.Y.

[21] Appl. No.: 328,977

[22] Filed: Dec. 9, 1981

[51] Int. Cl.³ .................... C08L 1/08; C08L 5/00; C08J 3/06
[52] U.S. Cl. ....................... 524/35; 524/55; 524/60; 524/458; 524/460; 524/501; 524/502; 524/510; 524/514; 523/130; 523/334
[58] Field of Search .................. 523/130, 334; 524/35, 524/55, 60, 458, 460, 501, 502, 510, 514

[56] References Cited

U.S. PATENT DOCUMENTS

| | | | |
|---|---|---|---|
| 3,282,874 | 11/1966 | Friedrich et al. | 260/29.2 |
| 3,507,840 | 4/1970 | Hurlock | 260/80 |
| 3,691,124 | 9/1972 | Barron | 260/29.6 WB |
| 3,740,360 | 6/1973 | Nimerick | 523/130 |
| 3,826,771 | 7/1974 | Anderson et al. | 260/29.6 H |
| 3,849,361 | 11/1974 | Zweigle | 260/33.2 R |
| 3,876,578 | 4/1975 | Takada et al. | 524/501 |
| 3,888,945 | 6/1975 | Arndt et al. | 260/876 R |
| 3,981,835 | 9/1976 | van Dyke | 523/130 |
| 4,021,399 | 5/1977 | Hunter et al. | 260/29.6 H |
| 4,024,097 | 5/1977 | Slovinsky et al. | 260/29.6 N |
| 4,029,622 | 6/1977 | Keller et al. | 260/29.6 WQ |
| 4,037,040 | 7/1977 | Trapasso et al. | 526/88 |
| 4,052,353 | 10/1977 | Scanley | 260/29.6 PM |
| 4,055,529 | 10/1977 | Burley | 524/501 |
| 4,090,992 | 5/1978 | Scanley | 260/29.6 AT |
| 4,105,510 | 8/1978 | Tago et al. | 203/14 |
| 4,110,291 | 8/1978 | Barabas et al. | 524/501 |
| 4,125,508 | 11/1978 | Elfers | 260/33.2 R |
| 4,157,995 | 6/1979 | Schenck et al. | 260/29.6 RW |
| 4,176,107 | 11/1979 | Buckman et al. | 260/29.6 E |
| 4,299,755 | 11/1981 | Keggenhoff et al. | 260/23 AR |

FOREIGN PATENT DOCUMENTS 905779 4/1960 United Kingdom .
1277577 6/1968 United Kingdom .

Primary Examiner—John Kight, III
Assistant Examiner—Nathan M. Nutter
Attorney, Agent, or Firm—Herbert P. Price

[57] ABSTRACT

This invention provides a non-gelling water-in-oil high solids slurry dispersion of water-soluble polymer.

The slurry dispersion composition contains between about 40–80 weight percent of water-soluble polymer, and is prepared by dehydrating a water-in-oil dispersion of synthetic water-soluble polymer, and then slurrying a quantity of finely divided water-soluble polymer into the dehydrated dispersion.

17 Claims, No Drawings

STABLE HIGH SOLIDS WATER-IN-OIL SLURRY DISPERSION COMPOSITION

BACKGROUND OF THE INVENTION

Various synthetic and natural water-soluble polymers have been developed which exhibit superior thickening and flocculating properties in aqueous solutions. These polymers are being used increasingly in a number of commercial applications such as in the clarification of aqueous systems, in paper making operations, in the treatment of sewage and industrial waste, in stabilizers for drilling muds, and in the secondary recovery of petroleum by water flooding.

Although these polymers are available commercially as powders or as finely divided solids, they are most frequently utilized as aqueous solutions. This requires the solid polymer material to be dissolved in water. This is a time consuming step as well as one which has serious drawbacks with respect to the actual dispersion of solids into the aqueous media.

Water-in-oil emulsions having finely divided water-soluble polymers dispersed therein are known in the art. The primary disadvantage of such emulsions is that attempted further treatment of such emulsions generally results in coagulation or agglomeration of the polymer whereby the polymer does not remain finely divided and dispersed in the emulsion.

Attempts to add surfactant to such emulsions to render the emulsions self inverting, whereby the polymer can be dispersed in aqueous solutions, have generally not been successful as a result of coagulation or agglomeration of the polymer. As a result, usually such emulsions are inverted into water by separately adding the surfactant and emulsion to the water, which necessitates separate shipping and handling of two products.

In U.S. Pat. Nos. 3,624,019 and 3,734,873, it is indicated that it is possible in some cases to prepare a self inverting water-in-oil emulsion having finely divided polymer and surfactant dispersed therein. However, there are limitations in that the addition of the surfactants may tend to interact with the emulsifier or emulsion and destroy it prior to use thereof.

Prior art references of interest relative to the present invention are those which are concerned with the production of stable water-in-oil emulsions of water-soluble polymers which are adapted for self inversion in aqueous solutions.

U.S. Pat. No. 4,052,353 describes a self water dissolving composition of a water-soluble polymer dispersed in oil which is comprised of (1) a water-in-oil dispersion of a water-soluble polymer, wherein the water content of the dispersion has been reduced by distillation to less than 40 weight percent; and (2) a water-soluble surfactant having an HLB number above 8.

Other prior art of interest relating to dispersions of water-soluble polymer in oil include U.S. Pat. Nos. 3,282,874; 3,691,124; 3,826,771; 3,849,361; 3,888,945; 4,021,399; 4,024,097; 4,029,622; 4,090,992; 4,125,508; 4,176,107; and 4,299,755.

There is continuing interest in the development of stable water-in-oil type dispersions of water-soluble polymers which are dispersible in aqueous solutions, and which preferably have a high solids content of water-soluble polymer.

Accordingly, it is an object of this invention to provide a stable water-in-oil dispersion of water-soluble polymer which is readily dispersible in aqueous media.

It is another object of this invention to provide a process for the production of a non-gelling water-in-oil dispersion of water-soluble polymer, which dispersion contains more than about 40 weight percent of water-soluble polymer.

Other objects and advantages of the present invention shall become apparent from the accompanying description and examples.

DESCRIPTION OF THE INVENTION

One or more objects of the present invention are accomplished by the provision of a process for the production of a non-gelling water-in-oil high solids slurry dispersion of water-soluble polymer which comprises (1) subjecting a water-in-oil dispersion of synthetic water-soluble polymer to distillation to reduce the water content to less than about 15 weight percent of the dispersion; and (2) slurrying a quantity of finely divided solid water-soluble polymer into the step (1) water-reduced dispersion to provide a slurry dispersion containing between about 40–80 weight percent of water-soluble polymer, based on the weight of the slurry dispersion composition.

The term "water-soluble polymer" refers to polymers and copolymers which are at least partially soluble in water at 25° C., and the term is meant to include polymers which are water-dispersible.

Illustrative of synthetic water-soluble polymers amenable to the step (1) procedure are those disclosed in U.S. Pat. No. 4,052,353, such as homo and copolymers of acrylamide, methacrylamide, acrylic acid, methacrylic acid, crotonic acid, fumaric acid, maleic anhydride, vinyl pyridine, quaternary and amino substituted acrylates, sulfoalkyl acrylates, vinyl benzene sulfonic acid and the like. Such monomers can be copolymerized with other monomers, such as alkyl acrylates and methacrylates, styrene, vinyl toluene, vinyl chloride and the like.

The finely divided solid water-soluble polymer employed in the step (2) slurrying procedure can be selected from the types of synthetic water-soluble polymers enumerated above, and additionally can be selected from natural and semi-synthetic polymers such as cellulose and polygalactomannan gums and their semi-synthetic derivatives. Illustrative of this type of polysaccharides are hydroxyethylcellulose, carboxymethylcellulose, guar gum, locust bean gum, xanthan gum, hydroxypropyl guar, carboxymethyl guar and the like.

A water-soluble polymer selected for purposes of the present invention typically will have a molecular weight of at least about 100,000.

The oil phase of the invention slurry dispersion compositions can be essentially any water-immiscible organic liquid which is compatible with the water-in-oil nature of the compositions. Suitable liquid organic media include hydrocarbons and substituted hydrocarbons such as benzene, toluene, xylene, kerosene, mineral oil, naphtha, perchloroethylene, chlorobenzene, nitrobenzene, and the like. Other organic liquids, such as dibutyl ether and ethylhexyl ketone can also be used. It is desirable that a water-immiscible solvent or solvent mixture employed as the oil phase does not dissolve more than about one percent of any water-soluble polymer which is dispersed in a slurry dispersion composition.

The starting water-in-oil dispersion of synthetic water-soluble polymer that is subjected to distillation in step (1) of the present invention process can be prepared by any one of a wide variety of procedures, and is preferably prepared by the water-in-oil emulsion polymerization technique for preparation of vinyl addition polymers. In accordance with such a procedure, a water-in-oil emulsion of water-soluble ethylenically unsaturated monomer(s) is formed and polymerized under free radical polymerization conditions to produce a latex of water-in-oil emulsion having finely divided polymer dispersed therein. A representative example of this technique is disclosed in U.S. Pat. No. 4,176,107 and several of the other references recited in the Background of the Invention section above.

Alternatively, a water-in-oil emulsion having finely divided water-soluble polymer dispersed therein can be prepared by dispersing previously prepared polymer in a water-in-oil emulsion. Such techniques involve comminuting the polymer to provide finely divided polymer and then dispersing the polymer in a water-in-oil emulsion by means of suitable agitation. In most cases, a suitable oil-soluble emulsifying agent is used in preparing the emulsion. The emulsifier should be inert with respect to the components present in the emulsion or used in the subsequent treatment, and generally will have an HLB under (Hydrophilic-Liphophilic Balance) below about 10.

The starting water-in-oil dispersion described above normally will contain above about 25 weight percent of each of the oil and water constituents, and above about 20 weight percent of the water-soluble polymer constituent.

It is highly preferred that the water-soluble polymer in the starting water-in-oil dispersion in step (1) has a particle size that is less than about 10 microns. A water-soluble polymer with a particle size higher than about 10 microns has a greater tendency to agglomerate under distillation conditions.

With respect to the distillation procedure in step (1) to reduce the water content to less than about 15 weight percent of the dispersion, in the usual case the overhead distillate will be in the form of a water-oil azeotrope. The oil phase (e.g., kerosene) is readily recoverable for recycle. The distillation may be run at atmospheric pressure but most preferably under reduced pressures.

In most cases it can be advantageous to include additional oil phase prior to the distillation procedure, or recycle it continuously or intermittently during the distillation as convenient or necessary. If the volume of oil phase is low at any time during the distillation, gelation of the water-in-oil dispersion may occur.

With respect to step (2) of the invention process wherein a quantity of finely divided solid water-soluble polymer is slurried into the water-reduced dispersion intermediate from step (1), the procedure is facilitated by efficient agitation and by the presence of a surfactant. The particle size of the solid water-soluble polymer being slurried into the dehydrated dispersion can be greater than 10 microns, e.g., the particles can be as large as 50–1000 microns in size.

If the finely divided solid water-soluble polymer is added directly to water-in-oil dispersion of synthetic water-soluble polymer without going through step (1) gelation of the mixture usually occurs within 24 hours.

The inclusion of a surfactant is advantageous for purposes of facilitating the rapid hydration of the slurry dispersion composition. The surfactant is employed in a quantity between about 0.1–20 weight percent, based on composition weight. If desired, a mixture of surfactants can be employed, e.g., one surfactant having an HLB below about 8, and another having an HLB above about 10.

Suitable surfactants are those selected from cationic, anionic and nonionic materials such as those described in U.S. Pat. Nos. 3,624,019; 4,021,399; 4,176,107; and references cited therein. Illustrative of surfactants are alkylene oxide adducts of linear alcohols and alkylphenols, sorbitan esters, ethoxylated sorbitan esters, fatty acid esters of polyalkylene oxides, ethoxylated fatty amides, alkyl sulfates and sulfonates, phosphate esters of ethoxylated linear alcohols and alkylphenols, long chain quaternary amines, olefin/N-vinyl/pyrrolidine copolymers and the like.

In a further embodiment, the present invention contemplates the inclusion of a finely divided inorganic substrate as an additional component. Particularly desirable is the inclusion of a stabilizer (e.g., an anti-settling agent) such as clay or silica. Other suitable inorganic fillers are pigments such as calcium carbonate, titanium dioxide, and the like. The inorganic material is employed in a stablizing quantity, such as between about 0.5 and 10 weight percent, based on the weight of slurry dispersion composition. If some settling does occur on long standing, it is readily redispersed by suitable agitation.

A water-in-oil high solids slurry dispersion composition of the present invention is suitable for the preparation of aqueous polymer solutions, preferably as a flocculant in various mineral processing operations, as a retention aid for fillers and water-removal accelerators in the production of paper, and also as a size for textiles or as a protective colloid. They are also suitable for various oil recovery operations.

The following Examples are further illustrative of the present invention. The reactants and other specific ingredients are presented as being typical, and various modifications can be devised in view of the foregoing disclosure within the scope of the invention.

EXAMPLE I

To a 1 liter three-neck flask equipped with stirrer and vacuum distillation apparatus are added 400 grams of a polyacrylamide inverse emulsion[1] containing about 28 weight percent polyacrylamide and about 40 weight percent water. To this are added dropwise 75 grams of kerosene. The emulsion is then subjected to vacuum distillation to remove water. A total of 159.1 grams of water-hydrocarbon azeotrope are removed at a final manometer reading of 8 mm Hg and a final temperature of 37° C. The azeotrope distillate contains 85 weight percent water. The milky dispersion remaining in the flask has a calculated water content of 7.9 weight percent and a calculated polymer content of 35.5 weight percent. It contains essentially no gel particles.

[1] American Cyanamid's 1320.

EXAMPLE II

Employing the same procedure of Example I, four inverse emulsions are dehydrated in accordance with step (1) of the invention process.

The compositions of the water-in-oil dispersions, before and after dehydration, are listed in Table I.

TABLE I

| Number | Water-Soluble Polymer | INVERSE EMULSION DISPERSION | | | | Grams Charge | Grams Kerosene Added | DEHYDRATED DISPERSION | | |
|---|---|---|---|---|---|---|---|---|---|---|
| | | % Polymer | % H$_2$O | % HC | % Surfact. | | | % H$_2$O | % Polymer | % HC |
| 1 | Ammonium Polyacrylate | 29.9 | 27.2 | 28.8[1] | 5.7 | 400 | 100 | 5.45 | 32.7 | 47.9 |
| 2 | 60/40 Acrylamide/ Acrylic Acid | 29.8 | 26.0 | 28.6[1] | 6.0 | 402.5 | 100 | 6.1 | 31.3 | 52.6 |
| 3 | 95/5 Acrylamide/ Acrylic Acid | 31.3 | 31.0 | 28.3[1] | 3.5 | 459.5 | 100 | 9.2 | 34.8 | 45.7 |
| 4 | 95/5 Acrylamide/ Ageflex FA-2Q[3] | 31.2 | 31.2 | 28.3[2] | 3.9 | 461 | 75 | 9.2 | 35.5 | 44.6 |

[1] Odorless Mineral Spirits
[2] Kerosene
[3] Dimethyl sulfate quat of 2-Diethylaminoethyl methacrylate; C.P.S.

EXAMPLE III

This Example illustrates the preparation of a high solids slurry dispersion composition in accordance with the present invention process.

A dehydrated 95/5 acrylamide/acrylic acid copolymer dispersion is prepared in the manner of Number 3 in Example II, except that it contains 9.0% water and 35.2% polymer.

To 50 grams of this dehydrated dispersion are added with stirring 17.6 grams of Natrosol 250 HR[1] premixed with 1.0 gram of Bentone 38[2]. The slurry dispersion is stirred for 15 minutes, then 1 gram of Triton X-114[3] is added and stirring is continued for an additional 15 minutes. The resulting smooth slurry dispersion composition contains 50.6% by weight total polymer with a 1:1 weight ratio of hydroxyethylcellulose; acrylamide/acrylic acid copolymer, based on the weight of slurry dispersion composition.

[1] Hydroxyethylcellulose; Hercules.
[2] Organic derivative of a special smectite clay; NL.
[3] Octylphenoxypolyethoxy ethanol; HLB=12.4; Rohm and Haas.

EXAMPLE IV

To 50 grams of the dehydrated dispersion of Example I are added 41.4 grams of powdered guar gum, premixed with 0.5 gram Bentone 38, with stirring. After stirring 15 minutes, 1.0 gram of Triton X-114 is added and stirring is continued for another 15 minutes. The resulting smooth slurry dispersion contains 63.7% by weight total polymer with a 7:3 weight ratio of guar:-polyacrylamide.

If the guar gum is added directly to the polyacrylamide inverse emulsion which has not been dehydrated, gelation occurs before all the guar gum is added.

In a similar manner, a 50 gram quantity of a dehydrated polyacrylamide containing 9.7% by weight water and 38.2% by weight polymer is slurried with 38.2 grams of solid polyacrylamide (Percol 351; Allied Colloids) which has been premixed with 0.75 gram of Bentone 38.

After 10 minutes of stirring, 1.0 gram of Triton X-114 is added and stirring is continued for another 10 minutes. The resulting slurry dispersion composition contains 63.7% by weight of polyacrylamide.

If the second stage solid polyacrylamide is added to the same polyacrylamide water-in-oil emulsion, except that it has not been dehydrated in accordance with Example I, then gelation occurs before all of the solid polyacrylamide is added.

EXAMPLE V

To 50 grams of the Number 4 dehydrated dispersion of Example II are added 41.5 grams of powdered guar gum, premixed with 0.5 gram Bentone 38, with stirring. After stirring 15 minutes, 1.0 gram of Triton X-114 is added, and stirring is continued for another 15 minutes. The smooth slurry-dispersion contains 65.8% total polymer with a 7:3 weight ratio of guar:acrylamide/FA-2Q copolymer.

EXAMPLE VI

Two present invention slurry dispersion compositions based on guar gum-polyacrylamide are evaluated vs. dry blends of guar gum-polyacrylamide as flocculants for acid-leached South African uranium ore. The results are summarized in Table II.

The data in Table II demonstrate that the slurry dispersion compositions in accordance with the present invention provide better efficiencies than the corresponding dry blended polymers, and provide the added convenience of being in a liquid form.

TABLE II

| | Relative Efficiency* |
|---|---|
| 1:1 Guar gum:Polyacrylamide Slurry Dispersion, 54.2% total polymer | 0.87 |
| 7:3 Guar gum:Polyacrylamide Slurry Dispersion, 69.1% total polymer | 0.94 |
| 1:1 Guar gum:Polyacrylamide Dry Blend | 1.00 = Std. |
| 7:3 Guar gum:Ployacrylamide Dry Blend | 1.03 |

*Pounds of polymer to obtain same floc settling rate at 1 pound of the standard.

EXAMPLE VII

Tables III and IV summarize the physical characteristics of paper prepared utilizing a slurry dispersion composition of the present invention as a retention and strength aid. It is compared with its individual polymer components.

TABLE III

1:1 Hardwood:Softwood
pH 5.5, 10% Clay, 30 lbs. alum/ton of paper

| | Polymer Level Lbs./Ton | % Retention |
|---|---|---|
| Blank | — | 27.55 |
| 95/5 Acrylamide/Acrylic Acid Inverse Emulsion | 0.3 1.0 | 69.63 82.30 |
| Guar Gum | 0.7 | 36.36 |

TABLE III-continued

1:1 Hardwood:Softwood
pH 5.5, 10% Clay, 30 lbs. alum/ton of paper

| | Polymer Level Lbs./Ton | % Retention |
|---|---|---|
| | 1.0 | 39.07 |
| Slurry-Dispersion of 7:3 Guar Gum: 95/5 Acrylamide/Acrylic Acid, 61.5% Polymer | 0.5 | 67.44 |
| | 1.0 | 71.85 |

TABLE IV

1:1 Hardwood:Softwood
pH 5.5, 30 lbs. alum/ton of paper

| | Polymer Level Lbs./Ton | Strength Internal Bond | Strength Corrected Mullen | Strength Corrected Tensile |
|---|---|---|---|---|
| Blank | — | 44.4 | 17.5 | 11.5 |
| 95/5 Acrylamide/ Acrylic Acid Inverse Emulsion | 1.8 | 63.5 | 20.2 | 12.8 |
| | 6.0 | 78.0 | 20.8 | 12.5 |
| Guar Gum | 4.2 | 58.9 | 19.2 | 13.7 |
| | 6.0 | 57.6 | 19.4 | 12.8 |
| Slurry-Dispersion of 7:3 Guar Gum: 95/5 Acrylamide/ Acrylic Acid, 61.5% Polymer | 3.0 | 76.1 | 19.5 | 12.8 |
| | 6.0 | 82.0 | 22.2 | 12.7 |

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A process for the production of a non-gelling water-in-oil high solids slurry dispersion of water-soluble polymer which comprises (1) subjecting a water-in-oil dispersion of synthetic water-soluble polymer to distillation to reduce the water content to less than about 15 weight percent of the dispersion; and (2) slurrying a quantity of finely divided solid water-soluble polymer into the step (1) water-reduced dispersion to provide a slurry dispersion containing between about 40–80 weight percent of water-soluble polymer, based on the weight of the slurry dispersion composition.

2. A process in accordance with claim 1 wherein the content of water-soluble polymer in the water-reduced dispersion produced in step (1) is in the range between about 20–40 weight percent of the dispersion.

3. A process in accordance with claim 1 wherein the dispersed water-soluble polymer in step (1) has a particle size below about 10 microns.

4. A process in accordance with claim 1 wherein the slurry dispersion composition contains a surfactant as an additional component.

5. A process in accordance with claim 1 wherein the slurry dispersion composition contains finely divided inorganic material as an additional component.

6. A process in accordance with claim 1 wherein the synthetic water-soluble polymer in step (1) is polyacrylamide.

7. A process in accordance with claim 1 wherein the solid water-soluble polymer in step (2) is natural or semisynthetic polysaccharide.

8. A process in accordance with claim 1 wherein the solid water-soluble polymer in step (2) is synthetic polymer.

9. A process in accordance with claim 1 wherein the solid water-soluble polymer in step (2) is polyacrylamide.

10. A process in accordance with claim 1 wherein the solid water-soluble polymer in step (2) is polyacrylic acid.

11. A process in accordance with claim 1 wherein the solid water-soluble polymer in step (2) is poly(acrylamide/acrylic acid) copolymer.

12. A process in accordance with claim 1 wherein the solid water-soluble polymer in step (2) is polygalactomannan gum.

13. A process in accordance with claim 1 wherein the solid water-soluble polymer in step (2) is guar gum.

14. A process in accordance with claim 1 wherein the solid water-soluble polymer in step (2) is hydroxypropylguar.

15. A process in accordance with claim 1 wherein the solid water-soluble polymer in step (2) is hydroxyethylcellulose.

16. A process in accordance with claim 1 wherein the oil phase in the slurry dispersion composition is a hydrocarbon medium.

17. A slurry dispersion composition produced in accordance with the process of claim 1.

* * * * *